US011885619B2

(12) United States Patent
Donadel et al.

(10) Patent No.: US 11,885,619 B2
(45) Date of Patent: Jan. 30, 2024

(54) MICROELECTROMECHANICAL GYROSCOPE HAVING A RESONANT DRIVING LOOP WITH CONTROLLED OSCILLATION AMPLITUDE AND METHOD OF CONTROLLING A MICROELECTROMECHANICAL GYROSCOPE

(71) Applicant: STMicroelectronics S.r.l., Agrate Brianza (IT)

(72) Inventors: Andrea Donadel, Meda (IT); Emanuele Lavelli, Mandello del Lario (IT); Stefano Polesel, Treviso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 36 days.

(21) Appl. No.: 17/847,000

(22) Filed: Jun. 22, 2022

(65) Prior Publication Data
US 2022/0412738 A1    Dec. 29, 2022

(30) Foreign Application Priority Data
Jun. 28, 2021    (IT) .......................... 102021000016880

(51) Int. Cl.
*G01C 19/5712*    (2012.01)
(52) U.S. Cl.
CPC ................. *G01C 19/5712* (2013.01)
(58) Field of Classification Search
CPC .......................... G01C 19/5712; G01C 19/5776
See application file for complete search history.

(56) References Cited

U.S. PATENT DOCUMENTS

| | | | | |
|---|---|---|---|---|
| 5,459,432 A | * | 10/1995 | White | H03D 1/00 |
| | | | | 375/321 |
| 8,843,343 B2 | * | 9/2014 | Pahr | H04N 25/77 |
| | | | | 250/214 R |

(Continued)

FOREIGN PATENT DOCUMENTS

EP    2259019 A1    12/2010

OTHER PUBLICATIONS

Rombach et al., "An Interface ASIC for MEMS Vibratory Gyroscopes With a Power of 1.6 mW, 92 dB DR and 0.007°/s/ $\sqrt{Hz}$ Noise Floor Over a 40 Hz Band," *IEEE Journal of Solid-State Circuits* 51(8):1915-1927, Aug. 2016.

*Primary Examiner* — David J Bolduc
(74) *Attorney, Agent, or Firm* — Seed IP Law Group LLP (57) ABSTRACT

A microelectromechanical gyroscope includes a support structure, a driving mass movable according to a driving axis; and an oscillating microelectromechanical loop. The microelectromechanical loop has a resonance frequency and a loop gain and includes the driving mass, a sensing interface that senses a position of the driving mass, and a gain control stage that maintains a modulus of the loop gain at a unitary value at the resonance frequency. The gain control stage includes a sampler and an transconductance operational amplifier in an open-loop configuration. The sampler acquires samples of a loop signal from the sensing interface in a first operative condition and transfers them to the transconductance operational amplifier in a second operative condition. The sampler decouples the transconductance operational amplifier from the sensing interface in the first operative condition and in the second operative condition.

20 Claims, 4 Drawing Sheets

(56) References Cited

U.S. PATENT DOCUMENTS

2015/0226556 A1    8/2015   Aaltonen
2019/0078889 A1    3/2019   Facchinetti

* cited by examiner

MICROELECTROMECHANICAL GYROSCOPE HAVING A RESONANT DRIVING LOOP WITH CONTROLLED OSCILLATION AMPLITUDE AND METHOD OF CONTROLLING A MICROELECTROMECHANICAL GYROSCOPE

BACKGROUND

Technical Field

The present disclosure relates to a microelectromechanical gyroscope having a resonant driving loop with controlled oscillation amplitude and to a method of controlling a microelectromechanical gyroscope.

Description of the Related Art

As is known, microelectromechanical gyroscopes are based on microstructures which comprise a support structure and a movable mass or a system of movable masses. The movable mass is maintained in oscillation with respect to a support structure along a driving axis with controlled frequency and amplitude. If the microstructure rotates around a rotation axis perpendicular to the driving axis, the movable mass is subject to an apparent or Coriolis force proportional to the rotation speed and perpendicular to both the driving axis and the rotation axis. Displacements of the movable mass caused by the Coriolis force may be sensed relatively easily, for example through capacitively coupled fixed and movable sensing electrode systems, and may be used to derive the angular speed of the gyroscope. The same principle substantially applies also in the case of multiaxial gyroscopes, wherein normally a common driving device provides the driving motion along one axis and the connections and constraints between movable masses are exploited to generate driving motions along one or more further axes.

To ensure the oscillatory motion with controlled frequency and amplitude, the driving devices are based on resonator loops that include the movable mass and apply actuation forces through capacitively coupled fixed and movable actuation electrodes. To ensure the conditions of oscillation, the resonator loops meet Barkhausen's stability criterion, i.e., at the resonance frequency, modulus of the loop gain equal to 1 and phase of the loop gain equal to 2n.

In known gyroscopes, the resonator loop is based on a phase-locked or PLL (Phase-Locked Loop) circuit and on a gain control stage. More specifically, a fully-differential charge amplifier converts reading signals from the microstructure, usually in the form of charge packets, into a differential voltage signal indicative of the capacitive coupling between the movable mass and the support structure and, consequently, of their relative position. Using a comparator, the differential signal is converted into a single-ended square wave signal which is fed to the PLL circuit. The PLL circuit locks the oscillation of the square wave signal and, through a forcing stage, applies forcing signals to the microstructure so that the Barkhausen's criterion on the loop phase is met. Furthermore, a gain tuning stage reads the differential voltage at the output of the charge amplifier and generates a control signal which, applied to the forcing stage, tunes the amplitude of the forcing signals so that the condition on the unit loop gain at the resonance frequency is ensured.

A limitation of known gyroscopes depends on the current consumption of the gain tuning stage, where the differential voltage signal supplied by the charge amplifier is demodulated, filtered to remove the high-frequency components, converted into a single-ended signal and compared with a reference voltage to obtain the control voltage. The filter used is usually an operational amplifier active filter, which if, on the one hand, has the advantage of reliability and precision, on the other hand continuously draws current through the resistive feedback network that sets the transfer function. The continuous current draw of the closed-loop operational amplifiers may be in contrast with the increasingly frequent request to reduce consumption, especially when the gyroscopes are used in portable or small devices, wherein the storage of electrical energy to have autonomy and satisfactory performance may be critical.

BRIEF SUMMARY

In various embodiments, the present disclosure provides a microelectromechanical gyroscope and a method of controlling a microelectromechanical gyroscope which allow the limitations described to be overcome or at least mitigated.

In at least one embodiment, a microelectromechanical gyroscope is provided that includes a support structure; a driving mass capacitively coupled to the support structure and movable relative to the support structure according to a driving axis; and an oscillating microelectromechanical loop, having a resonance frequency and a loop gain and including the driving mass, a sensing interface, configured to sense a position of the driving mass with respect to the support structure, and a gain control stage, configured to maintain a modulus of the loop gain at a unitary value at the resonance frequency. The gain control stage includes a sampler and an transconductance operational amplifier in open-loop configuration. The sampler is configured to acquire samples of a loop signal from the sensing interface in a first operative condition and to transfer the samples to the transconductance operational amplifier in a second operative condition. The sampler is configured to decouple the transconductance operational amplifier from the sensing interface in the first operative condition and in the second operative condition.

In at least one embodiment, an electronic system is provided that includes the microelectromechanical gyroscope and processing circuitry coupled to the microelectromechanical gyroscope.

In at least one embodiment, a method of controlling a microelectromechanical gyroscope that includes a support structure, a driving mass capacitively coupled to the support structure and movable relative to the support structure according to a driving axis and a microelectromechanical loop, having a resonance frequency and a loop gain and including the driving mass is provided. The method includes: setting the microelectromechanical loop in oscillation; sensing a position of the driving mass with respect to the support structure; and maintaining a modulus of the loop gain at a unitary value at the resonance frequency. The maintaining the modulus of the loop gain includes acquiring samples of loop signals indicative of a position of the driving mass with respect to the support structure and amplifying the samples in open loop, and the acquiring and amplifying are temporally separate and not overlapped.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
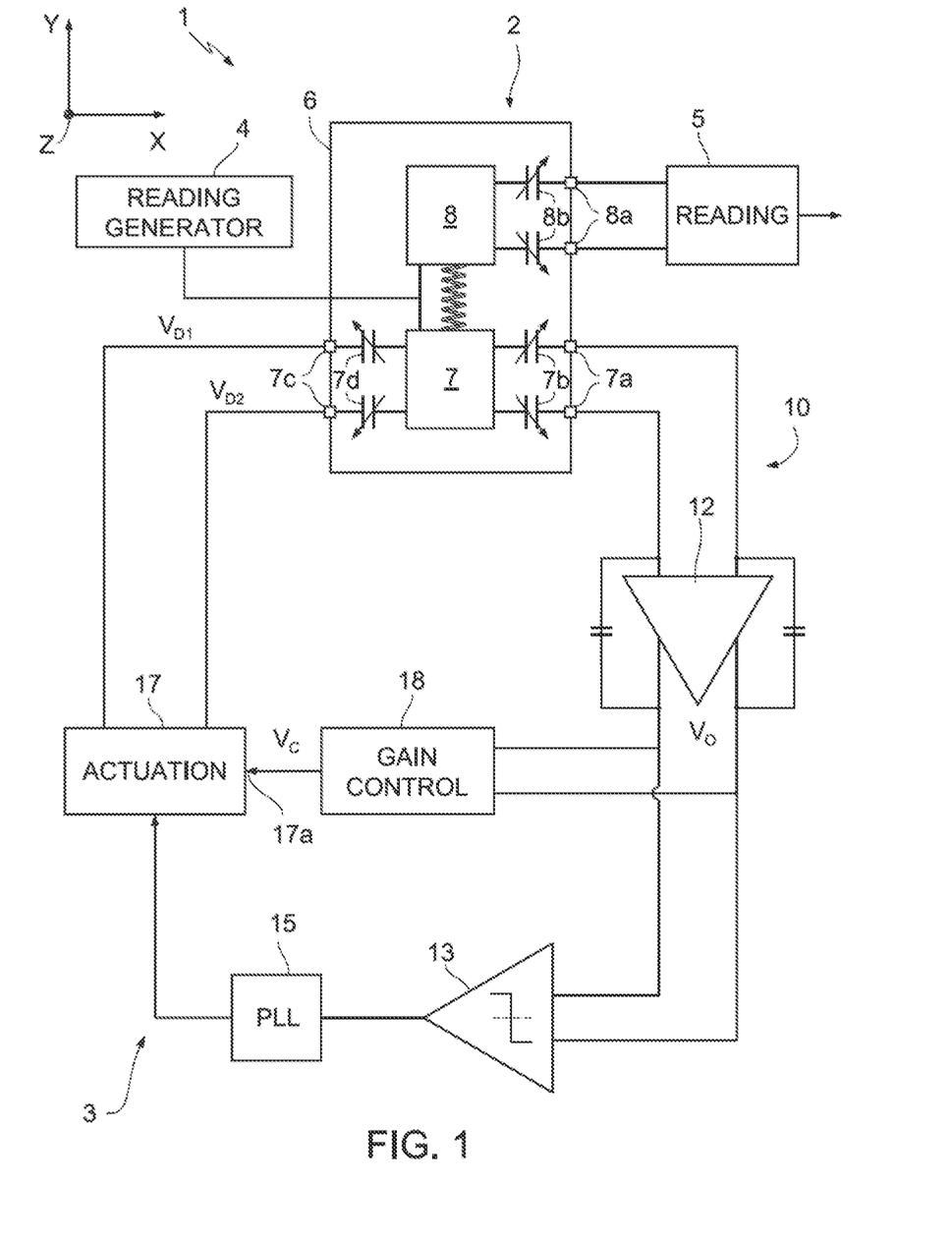
FIG. 1 is a simplified block diagram of a microelectromechanical gyroscope.

With reference to FIG. 1, a microelectromechanical gyroscope 1 comprises a microstructure 2, made of semiconductor material, a driving device 3, a reading generator 4 and a reading device 5.

The microstructure 2 is made of semiconductor material and, in one embodiment, comprises a support structure 6, a driving mass 7 and at least one sensing mass 8. For simplicity, in the embodiment illustrated herein reference will be made to the case of a uniaxial gyroscope, present in which is just one sensing mass 8. What is described hereinafter applies, however, also in the case of multiaxial gyroscopes, which comprise two or more sensing masses or systems of masses, for sensing rotations according to respective independent axes, for example pitch, roll and yaw axes. Furthermore, the driving mass 7 may coincide with the sensing mass: in this case, in practice, a single mass is movable along a perpendicular driving axis and sensing axis and performs both functions of driving and sensing the angular speed.

The driving mass 7 is elastically constrained to the support structure 6 so as to be oscillatable around a resting position according to a translational or rotational degree of freedom.

The sensing mass 8 is mechanically coupled to the driving mass 7 so as to be dragged along in motion according to the degree of freedom of the same driving mass 7. Furthermore, the sensing mass 8 is elastically constrained to the driving mass 7 so as to oscillate in turn with respect to the same driving mass 7, with a respective further degree of freedom. In the embodiment described herein, in particular, the driving mass 7 is linearly movable along a driving axis X, whereas the sensing mass 8 is movable with respect to the driving mass 7 according to a sensing axis Y perpendicular to the driving axis X. However, it is understood that the type of motion (translational or rotational) allowed by the degrees of freedom and the arrangement of the driving and sensing axes may vary according to the type of gyroscope.

Furthermore, the driving mass 7 (with the sensing mass 8) is connected to the support structure 6 so as to define a resonant mechanical system with a resonance frequency $f_R$ (according to the driving axis X). As already mentioned, the driving mass 7 and the sensing mass 8 may be coincident.

The driving mass 7 and the sensing mass 8 are capacitively coupled to the support structure 6. More specifically, a first driving capacitive coupling is defined between the driving mass 7 and first driving terminals 7a of the microstructure 2 by a first group of fixed and movable driving electrodes mutually coupled and schematically represented in FIG. 1 through capacitors 7b. A second driving capacitive coupling is defined between the driving mass 7 and second driving terminals 7c of the microstructure 2 by a second group of fixed and movable driving electrodes mutually coupled and schematically represented in FIG. 1 through capacitors 7d. A sensing capacitive coupling is defined between the sensing mass 8 and sensing terminals 8a of the support structure 6 by a group of fixed and movable sensing electrodes mutually coupled and schematically represented in FIG. 1 through capacitors 8b.

The driving device 3 is connected to the first driving terminals 7a and to the second driving terminals 7c so as to form, with the driving mass 7, an oscillating microelectromechanical loop 10, having a resonance frequency $f_R$ and configured to maintain the driving mass 7 (and the sensing mass 8 connected thereto) in oscillation with controlled amplitude and at driving frequency $f_D$ close to the resonance frequency $f_R$. The oscillation amplitude is programmed at the design stage according to preferences.

In one embodiment, the driving device 3 comprises a charge amplifier 12, a comparator 13, a phase-locked stage or PLL (Phase-Locked Loop) stage 15, an actuation stage 17 and a gain control stage 18.

The components of the driving device 3 cooperate to control the phase and the oscillation amplitude of the microelectromechanical loop 10.

The charge amplifier 12 is of fully-differential type and has inputs connected to the first driving terminals 7a of the microstructure 2. The charge amplifier 12 also defines a sensing interface and supplies a sensing voltage $V_O$ indicative of the position of the driving mass 7 with respect to the support structure 6 along the driving axis X.

The comparator 13 has inputs connected to the outputs of the charge amplifier 12 and switches at each zero-crossing of the sensing voltage $V_O$ present therebetween, thus operating as a frequency-detector device. The converter 13 in practice supplies the PLL stage 15 with a single-ended square wave signal at the oscillation frequency of the microelectromechanical loop 10. The PLL stage 15 locks the oscillation of the single-ended square wave signal and, through the actuation stage 17, applies differential driving signals $V_{D1}$, $V_{D2}$ to the second driving terminals 7c of the microstructure 2 so that the Barkhausen's criterion on the loop phase is met, i.e., $\varphi(G_{LOOP})=2$ (at the resonance frequency $f_R$, which is substantially equal to the driving frequency $f_D$; $G_{LOOP}$ is the loop gain of the microelectromechanical loop 10).

The actuation stage 17 has outputs connected to the second driving terminals 7c of the microstructure 2 to supply the driving voltages $V_{D1}$, $V_{D2}$ and to sustain the oscillation of the microelectromechanical loop 10 at the driving frequency $f_D$. For this purpose, a gain of the actuation stage 17 is determined by the gain control stage 18 through a control signal $V_C$ generated as a function of the sensing voltage $V_O$ oscillating on the outputs of the charge amplifier 12. In particular, the gain of the actuation stage 17 is determined in such a way that the condition of oscillation of the microelectromechanical loop 10 $|G_{LOOP}|=1$ at the resonance frequency $f_R$ is met.

Figure 2:
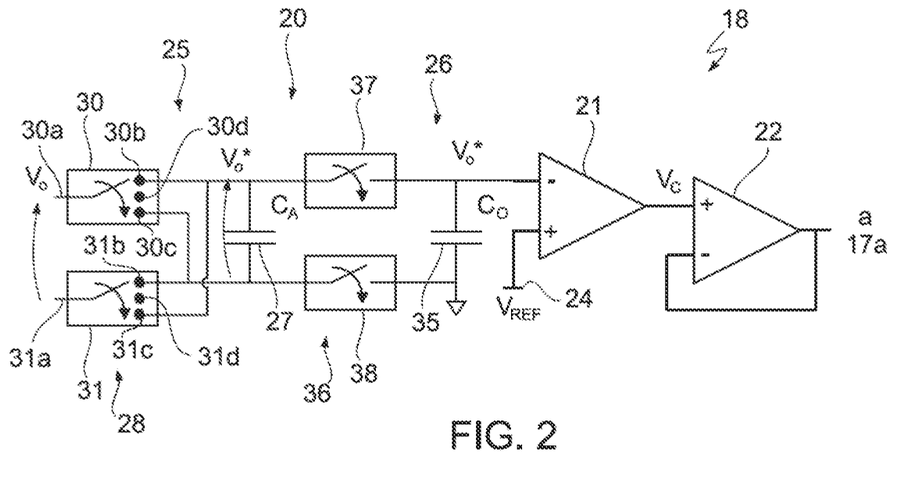
FIG. 2 is a more detailed block diagram of a detail of the microelectromechanical gyroscope of FIG. 1, according to an embodiment of the present disclosure.

FIG. 2 shows in more detail the gain control stage 18, which in one embodiment comprises a sampler 20, an transconductance operational amplifier (OTA) 21 and a buffer 22.

The sampler 20 has differential inputs coupled to respective outputs of the charge amplifier 12 and an output coupled to an input of the transconductance operational amplifier 21.

The sampler 20 is configured to transfer samples $V_O^*$ of the sensing voltage $V_O$ to the transconductance operational amplifier 21 in subsequent steps and without direct coupling between input and output.

The transconductance operational amplifier 21 is in an open-loop configuration and has a first input connected to the sampler 20 for receiving the samples $V_O^*$ of the sensing voltage $V_O$ and a second input connected to a reference voltage generator 24, which supplies a reference voltage $V_R$. The transconductance operational amplifier 21 also has an output supplying a control voltage $V_C$ and connected to a control input 17a of the actuation stage 17 through the buffer 22, which helps the driving. The control voltage $V_C$ is generated as a function of the comparison with the reference voltage $V_R$, which is selected so as to ensure the oscillation conditions of the microelectromechanical loop 10, in particular the condition on the modulus of the loop gain $|G_{LOOP}|=1$, and the oscillation amplitude of the driving mass 7 programmed during the design step.

In detail, the sampler 20 comprises an acquisition circuit 25 and an output circuit 26.

The acquisition circuit 25 comprises in turn an acquisition storage component 27, for example defined by an acquisition capacitor having an acquisition capacitance CA, and an acquisition connection circuit 28. In one embodiment, the acquisition connection circuit 28 comprises two three-way selectors 30, 31 having a respective input 30a, 31a connected to a respective output of the charge amplifier 12. The three-way selector 30 has a first output 30b and a second output 30c, respectively connected to a first terminal and a second terminal of the acquisition storage component 27, and a third output 30d which is floating. The three-way selector 31 has a first output 31b and a second output 31c, respectively connected to the second terminal and to the first terminal of the acquisition storage component 27, and a third output 31d which is floating.

The output circuit 26 comprises an output storage component 35, for example defined by an output capacitor having an output capacitance Co, and an output connection circuit 36. In one embodiment, the output capacitance Co is greater than the acquisition capacitance CA. The output connection circuit 36 comprises a switch 37, connected between the first terminal of the acquisition storage component 27 and a first terminal of the output storage component 35, and a switch 38, connected between the second terminal of the acquisition storage component 27 and a second terminal of the output storage component 35. The first terminal of the output storage component 35 defines an output of the sampler.

Figure 3:
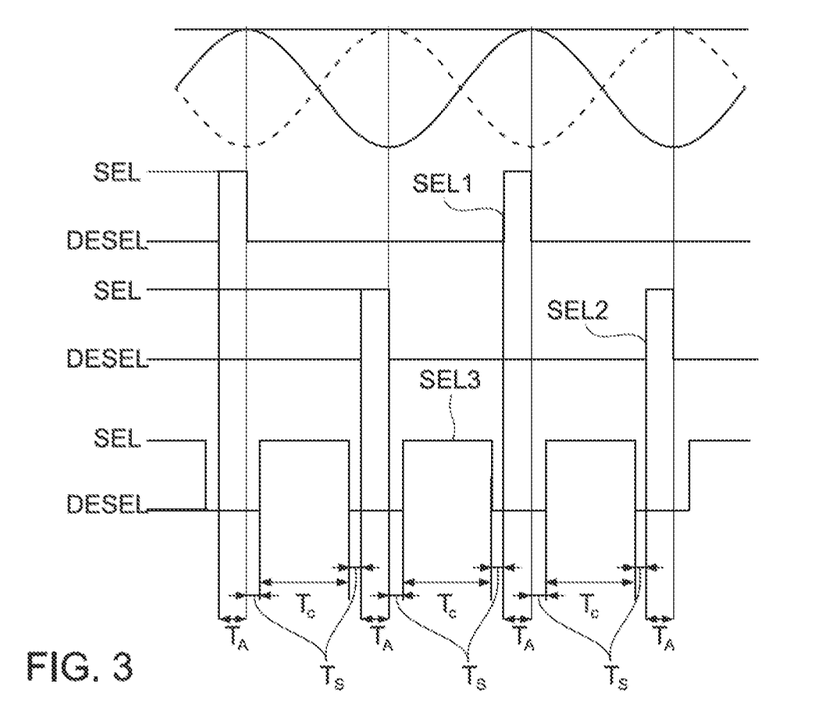
FIG. 3 is a graph showing quantities relating to the microelectromechanical gyroscope of FIG. 1.

The acquisition connection circuit 28 and the output connection circuit 36 are controlled by selection signals generated by the PLL stage 15 and therefore synchronous with the oscillations of the microelectromechanical loop 10. In particular, the acquisition connection circuit 28 receives a first selection signal $S_{SEL1}$ and a second selection signal $S_{SEL2}$, in phase opposition to each other, while the output connection circuit 35 receives a third selection signal $S_{SEL3}$. The selection signals $S_{SEL1}$, $S_{SEL2}$, $S_{SEL3}$ have a selection value SEL and a deselection value DESEL, as shown in FIG. 3 and have timing defined so that there is never a direct connection between the inputs and the output storage component (i.e., in practice, between the outputs of the charge amplifier 12 and the input of the transconductance operational amplifier 21).

The three-way selectors 30, 31 connect the respective input 30a, 31a:

to the respective first output 30b, 31b, when the first selection signal $S_{SEL1}$ has the selection value SEL;

to the respective second output 30c, 31c, when the second selection signal $S_{SEL2}$ has the selection value SEL;

to the respective third output 30d, 31d, when the first selection signal $S_{SEL1}$ and the second selection signal $S_{SEL2}$ both have the deselection value DESEL.

Therefore, the three-way selectors 30, 31 have:

a first state, wherein the acquisition storage component 27 is connected to the outputs of the charge amplifier 12 with a first polarity;

a second state, wherein the acquisition storage component 27 is connected to the outputs of the charge amplifier 12 with a second polarity opposite to the first polarity (i.e., with the first and second terminals of the acquisition storage component 27 connected to outputs of the charge amplifier 12 opposite with respect to the first state); and a third state, wherein the acquisition storage component 27 is disconnected from the outputs of the charge amplifier 12.

The switches 37, 38 are closed when the third selection signal $S_{SEL3}$ has the selection value SEL and open otherwise. Therefore, the output storage component 35 is connected to the acquisition storage component 27 (transfer state) only when the latter is disconnected from the charge amplifier 12 and is decoupled otherwise (cut-off state).

Regarding the timing, the first selection signal $S_{SEL1}$ and the second selection signal $S_{SEL2}$ remain at the selection value SEL in each cycle for an acquisition interval $T_A$ that ends at the maxima and minima of the sensing voltage $V_O$, respectively. For the remainder of each cycle, the first selection signal $S_{SEL1}$ and the second selection signal $S_{SEL2}$ have the deselection value DESEL. The third selection signal $S_{SEL3}$ is supplied to the output connection circuit 35 and has the selection value SEL only when both the first selection signal $S_{SEL1}$ and the second selection signal $S_{SEL2}$ are at the deselection value DESEL. In practice, the third selection signal $S_{SEL3}$ remains at the selection value SEL for a transfer interval $T_T$ in each half-cycle, without overlapping with the previous and subsequent acquisition intervals $T_A$ (the transfer intervals $T_T$ are alternated with acquisition intervals $T_A$). For example, transfer intervals $T_T$ and acquisition intervals $T_A$ are separated by a stabilization interval $T_S$ which allows transients caused by switching of the three-way selectors 30, 31 and/or switches 37, 38 to expire.

Consequently, in each cycle the acquisition storage component 27 is connected to the outputs of the charge amplifier 12 for the duration of the acquisition interval $T_A$ up to the positive peak and to the negative peak (respectively, first state and second state of the three-way selectors 30, 31) and is disconnected from the charge amplifier 12 outside of each acquisition interval $T_A$. Since, at each cycle, the three-way selectors 30, 31 are set to the first state up to the positive peak and to the second state up to the negative peak as described, the connection to the charge amplifier 12 is reversed twice and the samples $V_O^*$ stored in the acquisition storage component 27 always have the same sign. Hence, the acquisition connection circuit 28 also acts as a rectifier circuit.

The sampler 20 supplies the transconductance operational amplifier 21 with the samples $V_O^*$ in a form which is sufficiently stable to prevent disturbances, for example related to the switching or coming from the sampling process of the output signal of the charge amplifier 12, from degrading the operation of the transconductance operational amplifier 21, which is in an open-loop configuration. In particular, the sampler 20 separates the step of acquiring the samples $V_O^*$ from the step of transferring to the output, avoiding, in any operating condition, the direct connection between the input of the transconductance operational amplifier 21 and the outputs of the charge amplifier 12. The result is obtained thanks to the synchronization, on the one hand, of the selection of the state of the three-way selectors 30, 31 of at least one state (first or second) wherein the acquisition storage component 27 is connected to the charge amplifier 12 and a state wherein the acquisition storage component 27 and the charge amplifier 12 are disconnected; and on the other hand, of the switches 37, 38, which are in open or cut-off state when any of the three-way selectors 30, 31 is in the first or second state. Therefore, the first and second states of the three-way selectors 30, 31 and the closed or on state of the switches 37, 38 do not overlap in time (except for accessory operating needs of the gyroscope 1, such as for example for equalizing the nodes).

The sampling of the sensing voltage $V_O$ in two temporally distinct and non-overlapping steps allows for sufficient stability in the samples $V_O^*$ to be able to use the transconductance operational amplifier 21 in open loop. The rectifier function of the sampler 20 assists the sampling in this sense, further improving the result obtained. In turn, the open-loop configuration of the transconductance operational amplifier 21 allows for significant current savings due to the absence of a resistive feedback network and makes the gyroscope 1 particularly suitable for very-low-consumption applications.

The described configuration also allows a component to be saved with respect to known solutions, wherein closed-loop operational amplifiers are used. In fact, the sampler and the transconductance operational amplifier in open-loop perform substantially the same functions requiring or utilizing a demodulator, an active low-pass filter, based on a closed-loop operational amplifier, and a variable gain amplifier in known gyroscopes.

Figure 4:
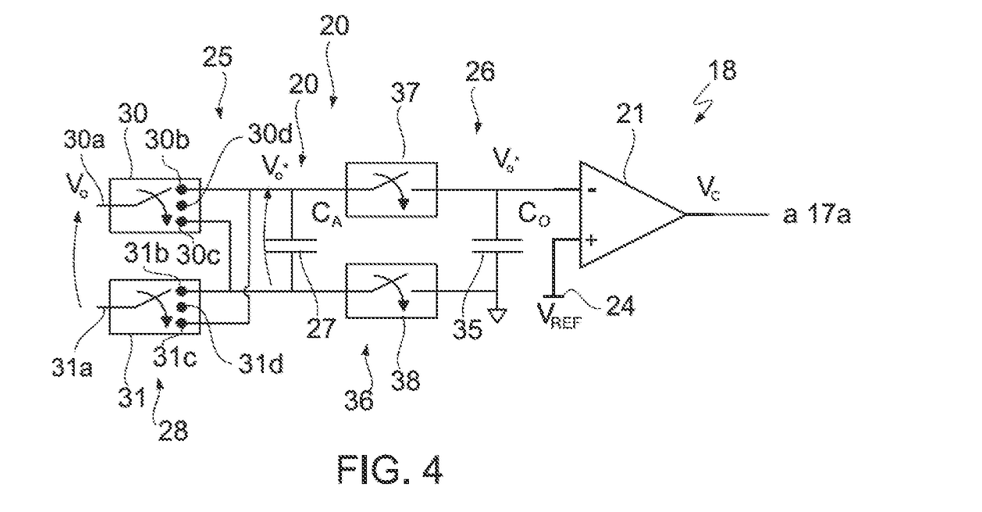
FIG. 4 is a more detailed block diagram of the detail of FIG. 2, according to a different embodiment of the present disclosure.

The buffer 22 is advantageous as it facilitates the driving of capacitive loads downstream of the transconductance operational amplifier 21. However, it is not essential and might be omitted as, for example, in the embodiment of FIG. 4.

Figure 5:
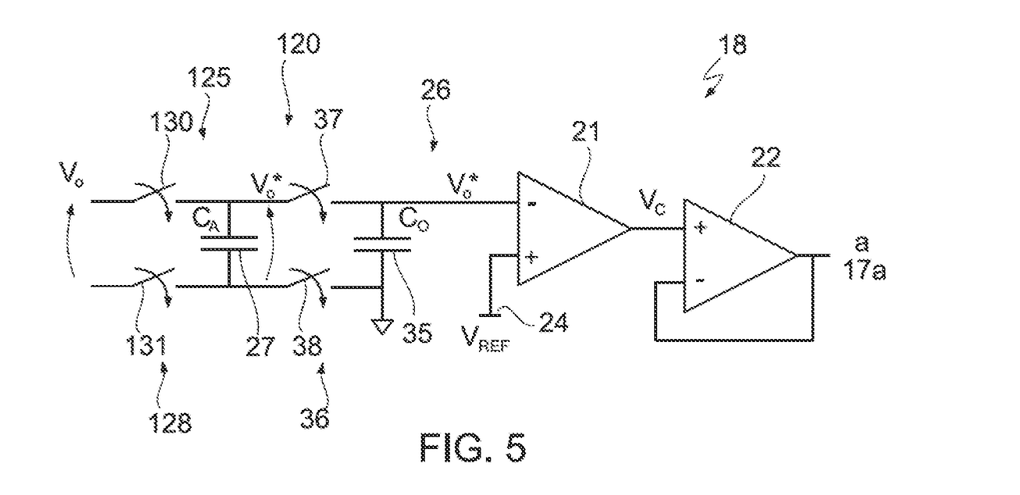
FIG. 5 is a more detailed block diagram of the detail of FIG. 2, according to a further embodiment of the present disclosure.

The rectifier function of the sampler is also not essential and is related to the sampling of both peaks of the output sinusoid of the stage 12. In fact, by sampling only the positive peaks, the rectifier function may not be included. In the embodiment of FIG. 5, for example, where parts equal to those already shown are indicated with the same reference numbers, in a gain control stage 118 the sampler, here indicated with 120, comprises an acquisition circuit 125 and the output circuit 26 already described, with the output storage component 35 and the output connection circuit 36 defined by the switches 37, 38.

The acquisition circuit 125 comprises in turn the acquisition storage component 27 and an acquisition connection circuit 128, which includes two switches 130, 131 each connected between a respective output of the charge amplifier 12 and a respective one of the first terminal and the second terminal of the acquisition storage component 27. Also in this case, the sampling is performed in two steps and the acquisition circuit 125 and the output circuit 26 are controlled so that the output storage component 35 is never directly connected to the charge amplifier 12. In practice, the switches 37, 38 are closed only after the switches 130, 131 have been opened and are reopened before the switches 130, 131 are closed. The time intervals wherein the switches 130, 131 and the switches 37, 38 remain closed are distinct and do not overlap, so that the switches 130, 131, 37, 38 are never closed all at the same time.

Figure 6:
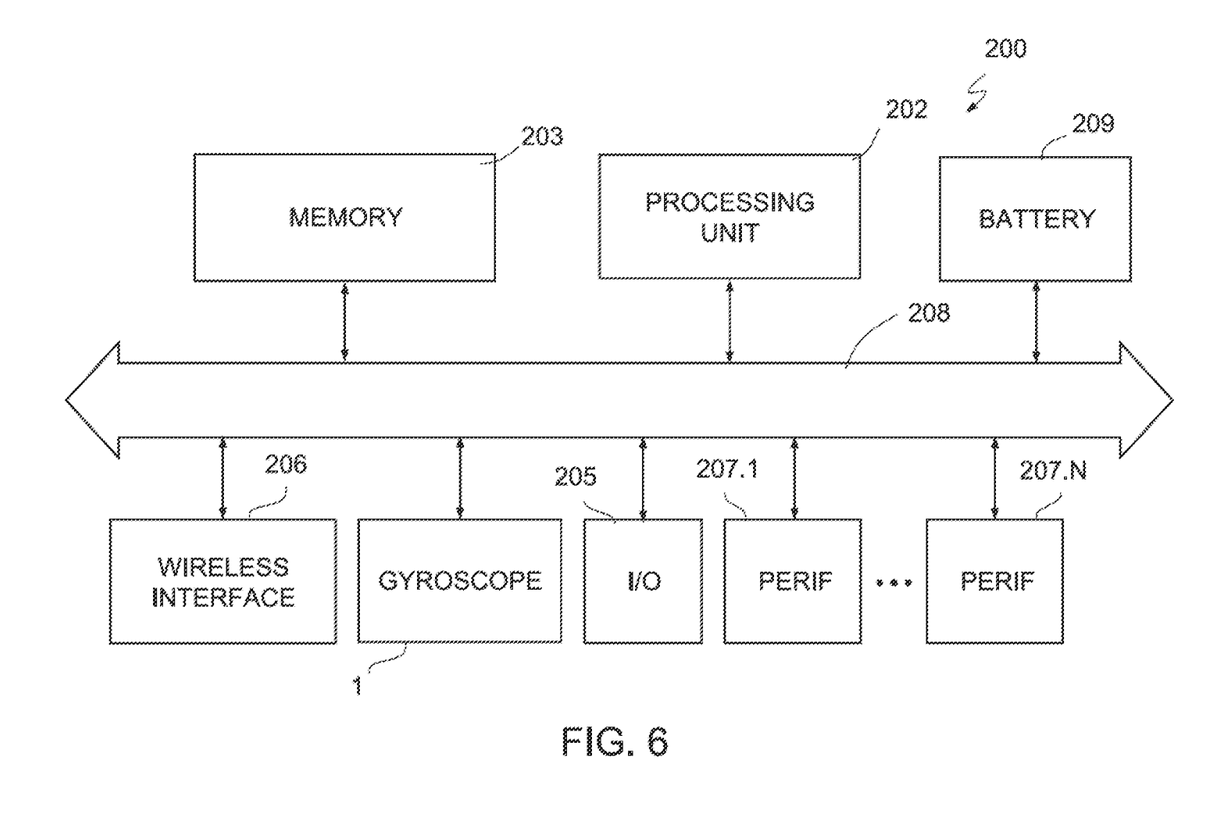
FIG. 6 is a simplified block diagram of an electronic system embedding a microelectromechanical gyroscope according to the present disclosure.

FIG. 6 shows an electronic system 200 which may be of any type, in particular, but not limited to, a wearable device, such as a watch, a smart bracelet or band; a computer, such as a mainframe, a personal computer, a laptop or a tablet; a smartphone; a digital music player, a digital camera or any other device for processing, storing, transmitting or receiving information. The electronic system 200 may be a general purpose or device-embedded processing system, an equipment or a further system.

The electronic system 200 comprises processing circuitry 202 (which may be referred to herein as a processing unit 202), memory devices 203, a microelectromechanical gyroscope according to the disclosure, for example the microelectromechanical gyroscope 1 of FIG. 1, and may also be provided with input/output (I/O) devices 205 (e.g., a keyboard, a pointer or a touch screen), a wireless interface 206, peripherals 207.1, ..., 207.N and possibly further auxiliary devices, not shown here. The components of the electronic system 200 may be coupled in communication with each other directly and/or indirectly through a bus 208. The electronic system 200 may further comprise a battery 209. It should be noted that the scope of the present disclosure is not limited to embodiments necessarily having one or all the listed devices.

The processing unit 202 may comprise, for example, one or more microprocessors, microcontrollers and the like, according to the design preferences.

The memory devices 203 may comprise volatile memory devices and non-volatile memory devices of various kinds, for example SRAM and/or DRAM memories for volatile-type and solid-state memories, magnetic disks and/or optical disks for the non-volatile type.

Finally, it is apparent that modifications and variations may be made to the microelectromechanical gyroscope and to the method described, without departing from the scope of the present disclosure, as defined in the attached claims.

A microelectromechanical gyroscope may be summarized as including a support structure (6); at least one driving mass (8) capacitively coupled to the support structure (6) and movable relative to the support structure (6) according to a driving axis (X); and an oscillating microelectromechanical loop (10), having a resonance frequency ($f_R$) and a loop gain ($G_{LOOP}$) and including the driving mass (7), a sensing interface (12), configured to sense a position of the driving mass (7) with respect to the support structure (6), and a gain control stage (18; 118), configured to maintain a modulus ($|G_{LOOP}|$) of the loop gain ($G_{LOOP}$) at a unitary value at the resonance frequency ($f_R$); wherein the gain control stage (18; 118) includes a sampler (20; 120) and an transconductance operational amplifier (21) in open-loop configuration; wherein the sampler (20; 120) is configured to acquire samples ($V_O^*$) of a loop signal ($V_O$) from the sensing interface (12) in a first operative condition and to transfer the samples ($V_O^*$) to the transconductance operational amplifier (21) in a second operative condition; and wherein the sampler (20; 120) is configured to decouple the transconductance operational amplifier (21) from the sensing interface (12) in the first operative condition and in the second operative condition.

The sampler (20; 120) may include an acquisition stage (25; 125) and an output stage (26); the acquisition stage (25; 125) may include an acquisition storage component (27) and an acquisition connection circuit (28; 128) having at least one connection state, in which the acquisition connection circuit (28; 128) couples the acquisition storage component (27) to the sensing interface (12), and a disconnection state, in which the acquisition connection circuit (28; 128) decouples the acquisition storage component (27) from the sensing interface (12); the output stage (26) may include an output storage component (35) and an output connection circuit (36) having a transfer state, in which the output connection circuit (36) couples the output storage component (35) to the acquisition storage component (27), and an cut-off state, in which the output connection circuit (36) decouples the output storage component (35) from the acquisition storage component (27); and the transfer state of the output connection circuit (36) may be temporally separate from the at least one connection state of the acquisition connection circuit (28; 128).

The acquisition storage component (27) may include a first capacitor having a first capacitance and the output storage component (35) may include a second capacitor having a second capacitance.

The acquisition connection circuit (28) may be configured to rectify the loop signal ($V_O$).

The acquisition connection circuit (28) may have a first connection state, in which the acquisition connection circuit (28) couples the acquisition storage component (27) to the sensing interface (12) with a first polarity, and a second connection state, in which the acquisition connection circuit (28) couples the acquisition storage component (27) to the sensing interface (12) with a second polarity, opposite to the first polarity.

The acquisition connection circuit (28) may include a first selector (30) having a first output (30$b$) and a second output (30$c$), respectively connected to a first terminal and to a second terminal of the acquisition storage component (27), and a third output (30$d$), which may be floating; and a second selector (31) having a first output (31$b$) and a second output (30$c$), respectively connected to the second terminal and to the first terminal of the acquisition storage component (27), and a floating third output (31$d$).

The microelectromechanical loop (10) may include a phase-locked stage (15) configured to generate selection signals ($S_{SEL1}$, $S_{SEL2}$, $S_{SEL3}$) synchronized to oscillations of the microelectromechanical loop (10) and wherein the acquisition connection circuit (28) and the output connection circuit (36) may be controlled by the selection signals ($S_{SEL1}$, $S_{SEL2}$, $S_{SEL3}$).

In each cycle of the loop signal ($V_O$) the acquisition connection circuit (28) may be set, by first selection signals ($S_{SEL1}$, $S_{SEL2}$), to the first connection state for an acquisition time interval ($T_A$) up to maxima of the loop signal ($V_O$) and to the second connection state for the acquisition time interval ($T_A$) up to minima of the loop signal ($V_O$).

The output connection circuit (35) may be set, by a second selection signal ($S_{SEL3}$), to the transfer state in each half-cycle of the loop signal ($V_O$) for a transfer time interval ($T_T$) separate from the previous and subsequent acquisition intervals ($T_A$) by a stabilization interval ($T_S$).

The microelectromechanical loop (10) may include an actuation stage (17), configured to apply driving signals ($V_{D1}$, $V_{D2}$) to the driving mass (7), and the transconductance operational amplifier (21) may be configured to supply the actuation stage (17) with a control signal ($V_C$) and a gain of the actuation stage (17) may be determined by the control signal ($V_C$) so that at the resonance frequency ($f_R$) a modulus of the loop gain ($G_{LOOP}$) may have a unitary value and the microelectromechanical loop (10) may have a controlled oscillation amplitude.

The gain control stage (18; 118) may include a reference voltage generator (24), supplying a reference voltage ($V_R$), wherein the transconductance operational amplifier (21) may have a first input coupled to the sampler (20; 120) to receive the samples ($V_O^*$) of the loop signal ($V_O$), a second input coupled to the reference voltage generator (24) to receive the reference voltage ($V_R$) and an output supplying the control signal ($V_C$) and the reference voltage ($V_R$) may be selected so that the control signal ($V_C$) causes the unitary value of the modulus of the loop gain ($G_{LOOP}$) and a controlled oscillation amplitude according to a programmed amplitude.

The gain control stage (18; 118) may include a buffer (22) between the transconductance operational amplifier (21) and the actuation stage (17).

The sensing interface (12) may include a fully-differential charge amplifier and the microelectromechanical loop (10) may include a comparator (13) having inputs connected to respective outputs of the charge amplifier.

An electronic system may be summarized as including a processing unit (202) and a gyroscope (1).

A method of controlling a microelectromechanical gyroscope may be summarized as including a support structure (6), at least one driving mass (7) capacitively coupled to the support structure (6) and movable relative to the support structure (6) according to a driving axis (X) and a microelectromechanical loop (10), having a resonance frequency ($f_R$) and a loop gain ($G_{LOOP}$) and including the driving mass (7); the method including setting the microelectromechanical loop (10) in oscillation; sensing a position of the driving mass (7) with respect to the support structure (6); and maintaining a modulus ($|G_{LOOP}|$) of the loop gain ($G_{LOOP}$) at a unitary value at the resonance frequency ($f_R$); wherein maintaining includes acquiring samples ($V_O^*$) of loop signals ($V_O$) indicative of a position of the driving mass (7) with respect to the support structure (6) and amplifying the samples ($V_O^*$) in open loop and wherein the steps of acquiring and amplifying are temporally separate and not overlapped.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope, comprising:
a support structure;
a driving mass capacitively coupled to the support structure and movable relative to the support structure according to a driving axis; and
an oscillating microelectromechanical loop, having a resonance frequency and a loop gain and including the driving mass, a sensing interface, configured to sense a position of the driving mass with respect to the support structure, and a gain control stage, configured to maintain a modulus of the loop gain at a unitary value at the resonance frequency;
wherein the gain control stage includes a sampler and an transconductance operational amplifier in open-loop configuration,
wherein the sampler is configured to acquire samples of a loop signal from the sensing interface in a first operative condition and to transfer the samples to the transconductance operational amplifier in a second operative condition, and wherein the sampler is configured to decouple the transconductance operational amplifier from the sensing interface in the first operative condition and in the second operative condition.

2. The gyroscope according to claim 1, wherein:

the sampler includes an acquisition stage and an output stage, the acquisition stage includes an acquisition storage component and an acquisition connection circuit having at least one connection state, in which the acquisition connection circuit couples the acquisition storage component to the sensing interface, and a disconnection state, in which the acquisition connection circuit decouples the acquisition storage component from the sensing interface, the output stage includes an output storage component and an output connection circuit having a transfer state, in which the output connection circuit couples the output storage component to the acquisition storage component, and an cut-off state, in which the output connection circuit decouples the output storage component from the acquisition storage component, and the transfer state of the output connection circuit is temporally separate from the at least one connection state of the acquisition connection circuit.

3. The gyroscope according to claim 2, wherein the acquisition storage component includes a first capacitor having a first capacitance and the output storage component includes a second capacitor having a second capacitance.

4. The gyroscope according to claim 2, wherein the acquisition connection circuit is configured to rectify the loop signal.

5. The gyroscope according to claim 2, wherein the acquisition connection circuit has a first connection state, in which the acquisition connection circuit couples the acquisition storage component to the sensing interface with a first polarity, and a second connection state, in which the acquisition connection circuit couples the acquisition storage component to the sensing interface with a second polarity, opposite to the first polarity.

6. The gyroscope according to claim 5, wherein the acquisition connection circuit includes:

a first selector having a first output and a second output, respectively connected to a first terminal and to a second terminal of the acquisition storage component, and a third output, which is floating; and a second selector having a first output and a second output, respectively connected to the second terminal and to the first terminal of the acquisition storage component, and a floating third output.

7. The gyroscope according to claim 5, wherein the microelectromechanical loop includes a phase-locked stage configured to generate selection signals synchronized to oscillations of the microelectromechanical loop and wherein the acquisition connection circuit and the output connection circuit are controlled by the selection signals.

8. The gyroscope according to claim 7, wherein in each cycle of the loop signal the acquisition connection circuit is set, by first selection signals, to the first connection state for an acquisition time interval up to maxima of the loop signal and to the second connection state for the acquisition time interval up to minima of the loop signal.

9. The gyroscope according to claim 8, wherein the output connection circuit is set, by a second selection signal, to the transfer state in each half-cycle of the loop signal for a transfer time interval separate from the previous and subsequent acquisition intervals by a stabilization interval.

10. The gyroscope according to claim 1, wherein the microelectromechanical loop includes an actuation stage, configured to apply driving signals to the driving mass, and wherein the transconductance operational amplifier is configured to supply the actuation stage with a control signal and a gain of the actuation stage is determined by the control signal so that at the resonance frequency a modulus of the loop gain has a unitary value and the microelectromechanical loop has a controlled oscillation amplitude.

11. The gyroscope according to claim 10, wherein the gain control stage includes a reference voltage generator, supplying a reference voltage, wherein the transconductance operational amplifier has a first input coupled to the sampler to receive the samples of the loop signal, a second input coupled to the reference voltage generator to receive the reference voltage and an output supplying the control signal and wherein the reference voltage is selected so that the control signal causes the unitary value of the modulus of the loop gain and a controlled oscillation amplitude according to a programmed amplitude.

12. The gyroscope according to claim 1, wherein the gain control stage includes a buffer between the transconductance operational amplifier and the actuation stage.

13. The gyroscope according to claim 1, wherein the sensing interface includes a fully-differential charge amplifier and the microelectromechanical loop comprises a comparator having inputs connected to respective outputs of the charge amplifier.

14. An electronic system, comprising:

a microelectromechanical gyroscope including:

a support structure;

a driving mass capacitively coupled to the support structure and movable relative to the support structure according to a driving axis; and an oscillating microelectromechanical loop, having a resonance frequency and a loop gain and including the driving mass, a sensing interface, configured to sense a position of the driving mass with respect to the support structure, and a gain control stage, configured to maintain a modulus of the loop gain at a unitary value at the resonance frequency; and processing circuitry coupled to the microelectromechanical gyroscope, wherein the gain control stage includes a sampler and an transconductance operational amplifier in open-loop configuration, wherein the sampler is configured to acquire samples of a loop signal from the sensing interface in a first operative condition and to transfer the samples to the transconductance operational amplifier in a second operative condition, and wherein the sampler is configured to decouple the transconductance operational amplifier from the sensing interface in the first operative condition and in the second operative condition.

15. The electronic system according to claim 14, wherein:

the sampler includes an acquisition stage and an output stage, the acquisition stage includes an acquisition storage component and an acquisition connection circuit having at least one connection state, in which the acquisition connection circuit couples the acquisition storage component to the sensing interface, and a disconnection state, in which the acquisition connection circuit decouples the acquisition storage component from the sensing interface, the output stage includes an output storage component and an output connection circuit having a transfer state, in which the output connection circuit couples the output storage component to the acquisition storage component, and an cut-off state, in which the output connection circuit decouples the output storage component from the acquisition storage component, and the transfer state of the output connection circuit is temporally separate from the at least one connection state of the acquisition connection circuit.

16. The electronic system according to claim 15, wherein the acquisition storage component includes a first capacitor having a first capacitance and the output storage component includes a second capacitor having a second capacitance.

17. The electronic system according to claim 15, wherein the acquisition connection circuit is configured to rectify the loop signal.

18. The electronic system according to claim 15, wherein the acquisition connection circuit has a first connection state, in which the acquisition connection circuit couples the acquisition storage component to the sensing interface with a first polarity, and a second connection state, in which the acquisition connection circuit couples the acquisition storage component to the sensing interface with a second polarity, opposite to the first polarity.

19. A method of controlling a microelectromechanical gyroscope that includes a support structure, a driving mass capacitively coupled to the support structure and movable relative to the support structure according to a driving axis and a microelectromechanical loop, having a resonance frequency and a loop gain and including the driving mass, the method comprising:

setting the microelectromechanical loop in oscillation;

sensing a position of the driving mass with respect to the support structure; and maintaining a modulus of the loop gain at a unitary value at the resonance frequency;

wherein maintaining the modulus of the loop gain includes acquiring samples of loop signals indicative of a position of the driving mass with respect to the support structure and amplifying the samples in open loop, and wherein the acquiring and amplifying are temporally separate and not overlapped.

20. The method according to claim 19, further comprising:

rectifying, by an acquisition connection circuit, the loop signals.

* * * * *